United States Patent [19]

Chasser et al.

[11] Patent Number: 6,069,221
[45] Date of Patent: May 30, 2000

[54] POWDER COATING COMPOSITIONS CONTAINING A CARBOXYLIC ACID FUNCTIONAL POLYESTER

[75] Inventors: Anthony M. Chasser, Allison Park; John R. Schneider, Glenshaw; Debra L. Singer, Wexford, all of Pa.

[73] Assignee: PPG Industries Ohio, Inc., Cleveland, Ohio

[21] Appl. No.: 09/127,193

[22] Filed: Jul. 31, 1998

Related U.S. Application Data

[63] Continuation-in-part of application No. 08/995,790, Dec. 22, 1997, which is a continuation-in-part of application No. 08/904,597, Aug. 1, 1997.

[51] Int. Cl.[7] .................................................. C08G 77/04
[52] U.S. Cl. .............................................................. 528/26
[58] Field of Search .................................................. 528/26

[56] References Cited

U.S. PATENT DOCUMENTS

| | | | |
|---|---|---|---|
| 4,091,049 | 5/1978 | Labana et al. | 428/417 |
| 4,681,811 | 7/1987 | Simpson et al. | 428/413 |
| 4,703,101 | 10/1987 | Singer et al. | 528/87 |
| 4,937,288 | 6/1990 | Pettit, Jr. et al. | 525/176 |
| 4,988,767 | 1/1991 | Pettit, Jr. | 525/194 |
| 5,407,707 | 4/1995 | Simeone et al. | 427/410 |
| 5,543,464 | 8/1996 | Decker et al. | 525/176 |

OTHER PUBLICATIONS

Filiform Corrosion in Polymer–coated Metals, A. Bautista, Progress in Organic Coatings 28, pp. 49–58 (1996).

*Primary Examiner*—Terressa M. Boykin
*Attorney, Agent, or Firm*—William J. Uhl

[57] ABSTRACT

Disclosed are improved curable powder coating compositions comprised of a particulate, film-forming mixture of a polymer having reactive functional groups, and a curing agent therefor having functional groups reactive with the functional groups of the polymer and present in an amount sufficient to cure the coating composition, wherein the inclusion of a particular polyester which has carboxylic acid functional groups improves adhesion to metal, particularly aluminum, and filiform corrosion resistance.

20 Claims, No Drawings

POWDER COATING COMPOSITIONS CONTAINING A CARBOXYLIC ACID FUNCTIONAL POLYESTER

This is a Continuation-in-Part of copending application Ser. No. 08/995,790, filed on Dec. 22, 1997, which is a Continuation-in-Part of copending application Serial No. 08/904,597, filed Aug. 1, 1997.

BACKGROUND OF THE INVENTION

The present invention relates to powder coating compositions with improved adhesion and filiform corrosion resistance.

More specifically, the invention relates to a powder coating composition comprising a solid particulate film-forming mixture of a polymer containing reactive functional groups and a curing agent therefor having functional groups reactive with the functional groups of the polymer with an additive to improve adhesion and filiform corrosion resistance.

Powder coating compositions for use in painting are extremely desirable. Such coating compositions can eliminate the organic solvents used in liquid paints. When the powder coating composition is thermally cured, little, if any, volatile material is given off to the surrounding environment. This is a significant advantage over liquid paints in which organic solvent is volatilized into the surrounding atmosphere when the paint is cured by heating.

A particular problem which often results from the use of powder coatings, particularly over aluminum substrates, is filiform corrosion. Filiform corrosion generally occurs in wet environments at the site of a surface defect in the presence of soluble ionic species. As described in *Filiform Corrosion in Polymer-coated Metals*, A. Bautista, PROGRESS IN ORGANIC COATINGS 28 at pages 49–58 (1996), this deterioration process gives rise to corrosion products which are characterized by a filamentous, worm-like appearance under the coatings. The "filaments" typically exhibit an arborescent structure and grow directionally under the coating.

Filiform corrosion can result in delamination of the coating from a metal substrate and it has become a matter for increasing concern in the areas of automotive, industrial and architectural coatings. Accordingly, it is desirable to provide a powder coating composition with improved filiform corrosion. It has been found that incorporation of certain polyesters having multiple carboxylic acid functional groups improves the filiform corrosion resistance of the powder coating composition.

Pending U.S. patent application Ser. No. 08/995,790 filed Dec. 22, 1997 discloses a powder coating composition having improved filiform corrosion resistance, wherein the improvement is due to the inclusion in the composition of an organic polysiloxane having various pendant reactive functional groups. Examples of these pendant functional groups include COOH, NCO, carbamate, primary and secondary amine and epoxy functional groups.

U.S. Pat. No. 5,543,464 teaches a powder coating composition comprised of an epoxy functional group containing acrylic polymer, and, as curing agents, a crystalline polycarboxylic acid and a semi-crystalline polycarboxylic acid group containing polyester. The polycarboxylic acid group containing polyesters are based on a polycondensation reaction of (cyclo) aliphatic and/or aromatic polyols with (cyclo) aliphatic and/or aromatic polycarboxylic acids or anhydrides, esters or acid chlorides based on these acids.

These acid functional polyester curing agents impart enhanced flexibility and improved impact resistance to the resultant coating.

U.S. Pat. No. 4,937,288 discloses a thermosetting powder coating composition which comprises a co-reactable particulate mixture of a carboxylic acid group-containing acrylic polymer, a second carboxylic acid group-containing material with crystallinity sufficient to assist the flow of the composition as it cures, and a beta-hydroxyalkylamide curing agent. The second carboxylic acid group-containing material is selected from the class of $C_4$ to $C_{20}$ aliphatic dicarboxylic acids, polymeric polyanhydrides, and preferably, low molecular weight carboxylic acid group-containing polyesters. The second carboxylic acid group-containing material provides flexibility and impact resistance of the resultant coating, as well as assisting in flow during cure of the powder coating composition.

U.S. Pat. No. 5,407,707 discloses a powder coating composition which comprises a solid, particulate mixture of 60 to 90 percent by weight of an epoxy functional copolymer and 10 to 40 weight percent of a polycarboxylic acid crosslinking agent. Suitable polycarboxylic acid crosslinking agents include crystalline aliphatic materials such as adipic, succinic, sebacic, azelaic and dodecanedioic acid. Low molecular weight polycarboxylic acid group-containing polyesters and half-acid esters can also be used.

SUMMARY OF THE INVENTION

The curable powder coating composition of the present invention comprises a particulate film-forming mixture of a polymer containing reactive functional groups and a curing agent therefor having functional groups reactive with the functional groups of the polymer and being present in an amount sufficient to cure the composition, the improvement comprising the inclusion in the composition of a polyester having multiple carboxylic acid functional groups, said polyester comprising an oligomer having the following structure:

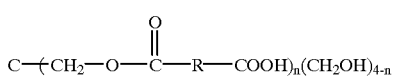

(I)

wherein
n is 2 to 4, and
R is $C_7$ to $C_{10}$ alkylene or a six-membered cyclic alkylene group, and where the polyester is present in an amount sufficient to improve the adhesion to metal and filiform corrosion resistance of the powder coating composition, but insufficient to cure the coating composition in the absence of the curing agent.

The polyester is the reaction product of pentaerithrytol and an excess of a dicarboxylic acid which has the following general structure:

(II)

wherein R is $C_{10}$ alkylene or a six-membered cyclic alkylene group.

The coating compositions of the invention are particularly useful for coating aluminum substrates.

DETAILED DESCRIPTION OF THE INVENTION

As aforementioned, the polyester can be prepared by a polycondensation reaction of pentaerithrytol and an excess of a dicarboxylic acid having the formula (II), wherein R is $C_7$ to $C_{10}$ alkylene or a six-membered cyclic alkylene group.

Preferably, when R is $C_{10}$ alkylene, the polyester is the reaction product of pentaerithrytol and dodecanedioic acid. When R is a six-membered cyclic alkylene group, the polyester is preferably the reaction product of pentaerithrytol and 1,4-cyclohexane dicarboxylic acid.

The pentaerithrytol and the dicarboxylic acid are reacted together at a molar ratio of from 1:6 to 1:8, preferably at a ratio of 1:8. A large excess of acid is desired to ensure an adduct with acid functionality having a number average molecular weight ($M_n$, as determined by gel permeation chromatography using a polystyrene standard) in the range of from 1000 to 4000, preferably from 2000 to 3000 The resultant low molecular weight polyester has an acid number of 310 to 420 (i.e., an acid equivalent weight of 130 to 180) and is a semi-crystalline solid at room temperature. Further, the resultant polyester having carboxylic acid functionality has a melting range of from 115° C. to 130° C., preferably from 118 ° C. to 123° C. By "semi-crystalline" is meant exhibiting a heterogeneous morphology, i.e., crystalline and amorphous phases; and typically opaque at ambient temperatures.

It should be appreciated that the above-described polycondensation reaction results in a complex mixture of monomers, i.e., unreacted pentaerithrytol and dicarboxylic acid; polyester oligomer and polyester polymer, which contains the polyester oligomer depicted in structure (I) above.

Besides the dicarboxylic acid, lower alkyl esters of the dicarboxylic acids can be used, such as $C_1$ ro 4 alkyl esters. Also, anhydride of the dicarboxylic acids, where they exist, can be used. Therefore, the term dicarboxylic acid is meant to include the acid itself and its functional equivalents, the lower alkyl esters and the anhydrides.

The polyester having carboxylic acid functional groups is typically present in the powder coating compositions in an amount sufficient to improve the adhesion to metal and filiform corrosion resistance of the powder coating composition, but insufficient to cure the coating composition in the absence of a curing agent. Typically, the polyester is present in an amount ranging from 1 to 30 weight percent, preferably from 2 to 10 weight percent, and more preferably from 2 to 5 weight percent, based on the total weight of resin solids in the powder coating composition. It is, of course, understood that the polyester is different from the polymers containing reactive functional groups and curing agents which are described below.

Polymers Containing Reactive Functional Groups

The polymer containing reactive functional groups suitable for use in the powder coating compositions of the invention can be chosen from a variety of materials, including, for example, acrylic polymers, polyurethane polymers, or polyester polymers having carboxylic acid functional groups, or acrylic polymers having epoxy functional groups.

In a preferred embodiment of the invention, the polymer containing reactive functional groups is a carboxylic acid group-containing acrylic polymer. Such polymers can be formed by reacting a polymerizable alpha, beta-ethylenically unsaturated carboxylic acid with one or more polymerizable, unsaturated monomers. Examples of carboxylic acid group-containing monomers which can be used are acrylic acid and methacrylic acid, which are preferred, as well as crotonic acid, itaconic acid, fumaric acid, maleic acid, citraconic acid and the like, and monoalkylesters of unsaturated dicarboxylic acids.

Examples of other suitable monomers include vinyl aromatic compounds such as styrene, alkyl-substituted styrenes such as alpha-methylstyrene and halide-substituted styrene such as chlorostyrene. Other suitable polymerizable, ethylenically unsaturated monomers which can be used are esters of acrylic and methacrylic acid such as methacrylate, ethyl acrylate, butyl acrylate, 2-ethylhexyl acrylate, methyl methacrylate, ethyl methacrylate, N-butyl methacrylate, and 2-ethylhexyl methacrylate. In addition to the aforementioned ethylenically unsaturated, copolymerizable monomers, nitriles, such as acrylonitrile, vinyl and vinylidene halides such as vinyl chloride and vinylidene fluoride, and vinyl esters such as vinyl acetate may be used.

The carboxylic acid group containing acrylic polymers are typically prepared under conventional free radical initiated polymerization conditions such as those described in U.S. Pat. No. 4,988,767 at column 3, line 58 to column 4, line 8, incorporated herein by reference. The carboxylic acid group-containing acrylic polymers can also be prepared by other techniques well known in the art such as emulsion polymerization, suspension polymerization, bulk polymerization or suitable combinations thereof.

The polymer containing reactive functional groups can also be a carboxylic acid group-containing polyurethane polymer. Such polymers can be prepared by reacting polyols and polyisocyanates so as to form a polyurethane polyol which is then reacted with polycarboxylic acid or anhydride to introduce free carboxyl groups into the reaction product. Examples of suitable polyols include aliphatic polyols such as ethylene glycol, propylene glycol, butylene glycol, 1,6-hexylene glycol, neopentyl glycol, cyclohexanedimethanol, trimethylolpropane and the like. Examples of suitable polyisocyanates are aromatic and aliphatic polyisocyanates with the aliphatic polyisocyanates being preferred for exterior durability. Specific examples include 1,6-hexamethylene diisocyanate, isophorone diisocyanate and 4,4'-methylene-bis-(cyclohexyl isocyanate). Examples of suitable polycarboxylic acids and anhydrides include succinic acid, adipic acid, azelaic acid, sebacic acid, terephthalic acid, isophthalic acid, tetrahydrophthalic acid, hexahydrophthalic acid, trimellitic acid and anhydrides of such acids.

In another preferred embodiment of the invention, the polymer containing reactive groups is a carboxylic acid group-containing polyester polymer. Such polyester polymers which are useful are those based on a condensation reaction of aliphatic polyols, including cycloaliphatic polyols, with aliphatic and/or aromatic polycarboxylic acids and anhydrides. Examples of suitable aliphatic polyols include 1,2-ethanediol, 1,3-propanediol, 1,4-butanediol, 1,6-hexanediol, neopentyl glycol, cyclohexane dimethanol, trimethylol propane, and the like. Suitable polycarboxylic acids and anhydrides include those as are described above in connection with the preparation of the carboxylic acid group-containing polyurethane. The polyol and the acid or anhydride are reacted together with an excess of acid over alcohol so as to form a polyester which has free carboxylic acid groups.

In another preferred embodiment, the polymer containing reactive functional groups is an epoxy functional group-containing acrylic polymer. Such epoxy functional group-containing acrylic polymers are typically copolymers of an ethylenically unsaturated monomer having at least one epoxy group and at least one polymerizable, ethylenically unsaturated monomer which is free of epoxy groups.

Examples of ethylenically unsaturated monomers containing epoxy groups are those containing 1,2-epoxy groups and include glycidyl acrylate, glycidyl methacrylate and allyl glycidyl ether.

Examples of ethylenically unsaturated monomers which do not contain epoxy groups are alkyl esters of acrylic and methacrylic acid containing form 1 to 20 carbon atoms in the alkyl group. Specific examples include methyl methacrylate, ethyl methacrylate, butyl methacrylate, ethyl acrylate, butyl acrylate, and 2-ethylhexyl acrylate.

Suitable other copolymerizable ethylenically unsaturated monomers include vinyl aromatic compounds such as styrene, and vinyl toluene; nitriles such as acrylonitrile and methacrylonitrile; vinyl and vinylidene halides such as vinyl chloride and vinylidene fluoride and vinyl esters such as vinyl acetate. Acid group-containing copolymerizable ethylenically unsaturated monomers such as acrylic acid and methacrylic acid are preferably not used because of the possible reactivity of the epoxy and acid groups.

The epoxy functional group-containing acrylic polymer is typically prepared by conventional means which are well known in the art, such as those described in U.S. Pat. No. 4,703,101 at column 2, lines 29 to 44, incorporated herein by reference.

The various materials used to form the functional group containing polymers of the present invention are selected such that the resultant material has a high glass transition temperature ($T_g$), that is, greater than 30° C. The $T_g$, which is a measure of the hardness and melt flow of a polymer, can be calculated as described by Fox in *Bull. Amer. Physics. Soc.*, 1,3 page 123 (1956). The $T_g$ can also be measured experimentally and differential scanning calorimetry can be used (rate of heating 10° C. per minute, $T_g$ taken at the first inflection point). Unless otherwise indicated, the stated $T_g$ as used herein refers to the calculated $T_g$ in the case of acrylic polymers, and measured $T_g$ in the case of condensation polymers such as polyesters and polyurethanes.

Typically, the polymer containing reactive functional groups is present in the powder coating composition of the invention in an amount ranging from 20 to 97 weight percent, preferably from 50 to 85 weight percent, said weight percentages based on the total weight of resin solids in the powder coating composition.

Curing Agents

As described above, the powder coating composition of the invention also comprises a curing agent having functional groups reactive with the functional groups of the polymer.

Polyepoxides as curing agents for carboxylic acid group-containing polymers are well known in the art. Examples of polyepoxides suitable for use as curing agents in the powder coating compositions of the present invention are those described in U.S. Pat. No. 4,681,811 at column 5, lines 33 to 58, incorporated herein by reference.

Beta-hydroxyalkylamides as curing agents for carboxylic acid group-containing polymers are well known in the art. Examples of beta-hydroxyalkylamides suitable for use as curing agents in the powder coating compositions of the invention are those described in U.S. Pat. No. 4,801,680 at column 2, line 42 to column 3, line 9, incorporated herein by reference.

Also useful as a curing agent for carboxylic acid group-containing polymers, as is well known in the art, is triglycidylisocyanurate (TGIC), a weatherable epoxy crosslinker commercially available as ARALDITE TM PT-810 from Ciba-Geigy.

Polyacids, particularly polycarboxylic acids, as curing agents for epoxy functional group-containing acrylic polymers are well known in the art. Examples of polycarboxylic acids and polycarboxylic acid group-containing polyesters suitable for use as curing agents in the powder coating compositions of the invention are those described in U.S. Pat. No. 5,407,707 at column 3, line 55 to column 4, line 10, incorporated herein by reference.

It is essential that the curing agent having functional groups reactive with the functional groups of the polymer is present in an amount sufficient to cure the powder coating composition. Typically, the curing agent is present in the powder coating composition of the invention in an amount ranging from 2 to 50 weight percent, preferably from 5 to 20 weight percent, said weight percentages based on the total weight of resin solids in the powder coating composition.

The powder coating compositions of the present invention can optionally include other materials such as pigments, fillers, light stabilizers, anti-oxidants and flow control agents and anti-popping agents.

A pigment can be included in the coating in amounts of up to 60 per cent by weight based on total weight of the composition in order to give a suitable color to the resultant coating. Suitable pigments include, for example, titanium dioxide, ultramarine blue, phthalocyanine blue, phthalocyanine green, carbon black, graphite fibrils, black iron oxide, chromium green oxide, ferride yellow and quindo red.

In addition, the powder coating composition may include fumed silica or the like to reduce caking of the powder during storage. An example of a fumed silica is commercially available from Cabot Corporation under the trademark CAB-O-SIL. The fumed silica is present in amounts ranging up to 1 percent by weight based on total weight of the powder coating formulations.

For good exterior durability, the compositions also can contain ultraviolet light absorbing agents, ultraviolet light stabilizers and antioxidants. Such materials are commercially available from Ciba-Geigy under the trademarks TINUVIN and IRGANOX. The ultraviolet light absorbing agents, ultraviolet light stabilizers and antioxidants, when used, are typically present in the compositions individually in amounts up to 6 percent by weight based on weight of resin solids.

One group of suitable flow control agents are acrylic polymers such as polylauryl acrylate, polybutyl acrylate, poly(2-ethylhexyl) acrylate, poly(ethyl-2-ethylhexyl) acrylate, polylauryl methacrylate and polyisodecenyl methacrylate. The flow control agent may also be a fluorinated polymer such as an ester of polyethylene glycol or polypropylene glycol and fluorinated fatty acids, for example, an ester of polyethylene glycol of a molecular weight of over 2,500 and perfluorooctanoic acid. Polymeric siloxanes of molecular weights over 1,000 may also be used as a flow control agent, for example, poly(dimethylsiloxane) or poly(methylphenyl)siloxane. The flow control agent, when used, is present in amounts up to 5 percent by weight based on total weight of the coating composition.

Anti-popping agents can be added to the composition to allow any volatile material to escape from the film during baking. Benzoin is a preferred anti-popping agent and when used is generally present in amounts up to 3.0 percent by weight based on total weight of the powder coating composition.

The powder coating compositions are typically prepared by melt blending the ingredients. This can be accomplished by first blending the ingredients in a high shear mixer such as a planetary mixer, and then melt blending in an extruder from 80° C. to 130° C. The extrudate is then cooled and pulverized into a particulate material which can be applied by spraying.

The particulate powder coating compositions can be applied directly to a substrate of, for example, metal such as steel or aluminum, or to a primed metal substrate. In particular, when the particulate coating compositions of the invention are applied to unprimed aluminum substrates as clear coats, an improvement in adhesion and filiform corrosion resistance is noted. Application can be by spraying, and in the case of a metal substrate, by electrostatic spraying which is preferred, or by the use of a fluidized bed. The coating composition can be applied as a primer or as a primer surfacer, or as a topcoat or as a finishing coat. The powder coating can be applied in a single sweep or in several passes to provide a film having a thickness after cure of from 1 to 10 mils (25.4 to 254 microns), usually 2.0 to 4.0 mils (50.8 to 100.4 microns).

After application of the powder coating composition, the powder coated substrate is baked at a temperature sufficient to cure the product, typically at 250° F. to 400° F. (121° to 204° C.) for 1 to 60 minutes, and preferably at 300° F. to 350° F. (160° to 175° C.) for 15 to 30 minutes.

The following examples illustrate the invention and should not be construed as a limitation on the scope thereof. Unless specifically indicated otherwise, all percentages and amounts are by weight.

EXAMPLES

Examples 1 through 5 describe the preparation of various carboxylic acid functional polyesters. Example 1 describes the preparation of a carboxylic acid functional polyester based on pentaerithrytol and dodecanedioic acid. Example 2 describes the preparation of a carboxylic acid functional polyester based on pentaenthrytol and 1,4-cyclohexane dicarboxylic acid and Example 3 describes the preparation of a carboxylic acid functional polyester based on 1,6-hexanediol and dodecanedioic acid. Examples 5 and 6 describe the preparation of polyesters based on pentaerithrytol and adipic acid, and di-trimethylol propane and adipic acid, respectively.

Examples A through D describe the preparation of various powder compositions. Example A describes the preparation of two powder coating compositions based on a carboxylic acid functional acrylic polymer and a polyepoxide curing agent. Example A-1 describes a powder coating composition containing the carboxylic acid functional polyester of Example 1 for improved filiform corrosion resistance, while Comparative Example A-2 contains no polyester.

Example B describes the preparation of six powder coating compositions based on an epoxy functional group containing acrylic polymer and a carboxylic acid group containing curing agent. Each of the Examples B-1 through B-5 contains a carboxylic functional polyester of Example 1 through Example 5, respectively. Comparative Example B-6 contains no polyester.

Example C describes the preparation of four powder coating compositions based on a carboxylic acid functional polyester polymer and a beta-hydroxyalkylamide curing agent. Each of Examples C-1 through C-3 incorporates a polyester of Example 1 through Example 3, respectively. Comparative Example C-4 contains not carboxylic acid functional polyester.

Example D describes the preparation of two powder coating compositions based on an epoxy functional group containing acrylic polymer and a carboxylic acid functional materials. Example D-1 contains both the carboxylic acid functional polyester of Example 1 and a carboxylic acid functional curing agent, while Comparative Example D-2 contains only the carboxylic acid functional polyester with no curing agent.

Example 1

This example describes the preparation of a carboxylic acid functional polyester based on pentaerithrytol and dodecanedioic acid. The polyester is prepared from a mixture of the following ingredients:

| Ingredients: | Parts by Weight (grams) | % on Solids | Equivalent Weight |
|---|---|---|---|
| Pentaerithrytol | 544.64 | 6.88% | 34.04 |
| Dodecanedioic acid | 7360.00 | 92.92% | 115.00 |
| Dibutyl tin oxide | 7.90 | 0.10% | — |
| Triphenyl phosphite | 7.90 | 0.10% | — |
| Total | 7920.45 | 100% | |

The above ingredients were combined in a suitable reaction vessel equipped with a thermocouple, stirrer, nitrogen gas inlet and a partial condenser with a distilling head. Under a light nitrogen sparge, the reaction mixture was heated to a temperature of 151° C. over a period of 3.5 hours, whereupon water began to distill off. Heating was continued as the temperature increased to 180° C. over a one hour period. That temperature was held over a period of 3.5 hours to a stalled acid value of about 352. At this time approximately 218.0 grams of water had been collected.

The polyester thus prepared was a fluid liquid which upon discharge from the reaction flask, was permitted to cool, yielding a semi-crystalline solid with an acid value of 351.5.

Example 2

This example describes the preparation of a carboxylic acid functional polyester based on pentaerithrytol and 1,4-cyclohexane dicarboxylic acid. The polyester is prepared from a mixture of the following ingredients:

| Ingredients: | Parts by Weight (grams) | % on Solids | Equivalent Weight |
|---|---|---|---|
| Pentaerithrytol | 204.24 | 8.98% | 34.04 |
| Cyclohexanediacid | 2066.16 | 90.82% | 86.09 |
| Dibutyl tin oxide | 2.27 | 0.10% | — |
| Triphenyl phosphite | 2.27 | 0.10% | — |
| Total | 2274.94 | 100% | |

The above ingredients were combined in a suitable reaction vessel equipped with a thermocouple, stirrer, nitrogen gas inlet and a partial condenser with a distilling head. Under a light nitrogen sparge, the reaction mixture was heated to a temperature of about 158° C. over a period of about 2.5 hours, whereupon water began to distill off. Heating was continued as the temperature increased to about 200° C. over a 0.75 hour period. That temperature was held over a period of about 0.5 hour to a stalled acid value of about 466. At this time approximately 83.0 grams of water had been collected.

The polyester thus prepared was a fluid liquid which upon discharge from the reaction flask, was permitted to cool, yielding a semi-crystalline solid with an acid value of 462.9.

Example 3

This example describes the preparation of a carboxylic acid functional polyester based on 1,6-hexanediol and dodecanedioic acid. The polyester is prepared from a mixture of the following ingredients:

| Ingredients: | Parts by Weight (grams) | % on Solids | Equivalent Weight |
|---|---|---|---|
| 1,6-Hexanediol | 826.00 | 29.28% | 59.00 |
| Dodecanedioic acid | 1993.18 | 70.67% | 115.00 |
| Dibutyl tin oxide | 1.41 | 0.05% | — |
| Total | 2820.59 | 100% | |

The above ingredients were combined in a suitable reaction vessel equipped with a thermocouple, stirrer, nitrogen gas inlet and a partial condenser with a distilling head. Under a light nitrogen sparge, the reaction mixture was heated to a temperature of about 151° C. over a period of about 2 hours, whereupon water began to distill off. Heating was continued as the temperature increased to about 220° C. over about a 3.5 hour period. That temperature was held over a period of about 1.5 hours to a stalled acid value of about 72.8. At this time approximately 215 grams of water had been collected.

The polyester thus prepared was a fluid liquid which upon discharge from the reaction flask, was permitted to cool, yielding a semi-crystalline solid with an acid value of 76.2.

Example 4

This example describes the preparation of a carboxylic acid functional polyester based on pentaerithrytol and adipic acid. The polyester is prepared from a mixture of the following ingredients:

| Ingredients: | Parts by Weight (grams) | % on Solids | Equivalent Weight |
|---|---|---|---|
| Pentaerithrytol | 204.24 | 10.42% | 34.04 |
| Adipic acid | 1752.00 | 89.38% | 73.00 |
| Dibutyl tin oxide | 1.96 | 0.10% | — |
| Triphenyl phosphite | 1.96 | 0.10% | — |
| Total | 1960.15 | 100% | |

The above ingredients were combined in a suitable reaction vessel equipped with a thermocouple, stirrer, nitrogen gas inlet and a partial condenser with a distilling head. Under a light nitrogen sparge, the reaction mixture was heated to a temperature of about 156° C. over a period of about 2.0 hours, whereupon water began to distill off. Heating was continued as the temperature increased to about 200° C. over a 1.0 hour period. That temperature was held over a period of about 0.5 hour to a stalled acid value of about 545.2. At this time approximately 83.0 grams of water had been collected.

The polyester thus prepared was a fluid liquid which upon discharge from the reaction flask, was permitted to cool, yielding a semi-crystalline solid with an acid value of 537.5.

Example 5

This example describes the preparation of a carboxylic acid functional polyester for use as an additive in the powder coating compositions of the invention. The polyester is prepared from a mixture of the following ingredients:

| Ingredients: | Parts by Weight (grams) | % on Solids | Equivalent Weight |
|---|---|---|---|
| Di-trimethylol propane | 190.17 | 17.80% | 63.39 |
| Adipic acid | 876.00 | 82.00% | 73.00 |
| Dibutyl tin oxide | 1.07 | 0.10% | — |
| Triphenyl phosphite | 1.07 | 0.10% | — |
| Total | 1068.30 | 100% | |

The above ingredients were combined in a suitable reaction vessel equipped with a thermocouple, stirrer, nitrogen gas inlet and a partial condenser with a distilling head. Under a light nitrogen sparge, the reaction mixture was heated to a temperature of about 157 C. over a period of about 1.5 hours, whereupon water began to distill off. Heating was continued as the temperature increased to about 180° C. over a 1.25 hour period. That temperature was held over a one hour period to a stalled acid value of about 497.8. At this time approximately 34.0 grams of water had been collected.

The polyester thus prepared was a fluid liquid which upon discharge from the reaction flask, was permitted to cool, yielding a semi-crystalline solid with an acid value of 497.3.

Powder Coating Composition

Testing Procedures

Each of the following powder coating compositions was electrostatically applied to cleaned only aluminum substrate (commercially available from ACT, Inc. as A407A1), then cured as described below. The powder coated panels were then tested for various physical properties to include solvent resistance/extent of cure, 20° gloss, filiform corrosion resistance and general appearance. The powder coating formulations were tested for stability and thermal shock resistance.

Solvent resistance/extent of cure was tested according to ASTM D5402 using methyl ethyl ketone (MEK) double rubs. Results are reported for appearance and mar after 200 double rubs, or, alternately, as the number of double rubs completed before breaking through the coating to the substrate. 20° gloss was determined using a BYK-Gardner haze-glossmeter. Appearance was evaluated via visual inspection.

Filiform corrosion resistance was tested by scribing the cured coated substrate, exposing the scribed test panel in the Copper Accelerated Acetic Acid Salt Spray ("CASS") test cabinet according to ASTM B368-68 for 6 hours, then thoroughly rinsing the panel with deionized water. These rinsed panels were subsequently exposed to an 85% relative humidity/60° C. environment for a period of up to 4 weeks. Results reported represent the average length (in millimeters) of corrosion filiments as measured outward from the scribe line.

Powder stability was tested by placing a sealed 2 ounce sample of the powder coating composition in a water bath at 40° C. for one week. The powder was then examined for caking and/or fusing together of powder particles. Thermal shock resistance was tested by soaking cured powder coated panels in water at 100° F. for 4 hours, then immediately transferring the panels to a 30° C bath to cool. Once cooled, panels were scribed and within 30 seconds the scribed area was exposed to a 5 psi steam blast. Panels were then visually examined for blushing, water spotting and adhesion loss. Results are reported as pass/fail.

Example A

This example describes the preparation of two powder coating compositions based on a carboxylic acid functional acrylic polymer and a polyepoxide curing agent. Example A-1 contains the carboxylic acid functional polyester for improved filiform corrosion resistance, and Comparative Example A-2 contains no polyester. Each of the examples was prepared from a mixture of the following ingredients:

| Ingredients: | Example A-1 (grams) | Comparative Example A-2 (grams) |
|---|---|---|
| TGIC[1] | 67.8 | 41.6 |
| CRYLCOAT 450[2] | 357.0 | 432.5 |
| Pentasiloxane[3] | 30.4 | 30.3 |
| Polyester of Example 1 | 50.8 | — |
| URAFLOW B[4] | 5.2 | 5.2 |
| IRGANOX 1076[5] | 5.1 | 5.1 |
| RESIFLOW PL-200[6] | 5.6 | 5.6 |
| TROY 570[7] | 5.2 | 5.2 |

[1]Triglycidylisocyanurate, commercially available from CYTEC Corp.
[2]Acid functional polyester, commercially available from UCB Chemicals.
[3]Acid functional polysiloxane (SiO)$_5$, the preparation of which is described in Example 2 of U.S. patent application Ser. No. 08/995,790, filed 22 December 1977.
[4]Benzoin, commercially available from Monsanto Chemical Co.
[5]Polyphenol antioxidant available from Ciba-Geigy Corp.
[6]Silica/acrylic polymer dispersion, a flow control additive available from Estron Chemical, Inc.
[7]Silicone/amide flow control additive, available from Troy Chemical Corp.

The ingredients of each of the Examples A-1 and A-2 immediately above were mixed via typical powder compounding techniques. Each powder composition was electrostatically applied to cleaned only aluminum substrate then cured at 340° F. (171° C.) for 20 minutes, and tested as described above for filiform corrosion resistance, haze rating, haze cracking and 20° gloss. The following Table 1 illustrates the advantages for improved filiform corrosion resistance, while maintaining other performance properties, obtained by the incorporation of the carboxylic acid functional polyester into the powder coating composition.

TABLE 1

| Test performed: | Example A-1 | Example A-2 (Comparative) |
|---|---|---|
| 20° Gloss | 89 | 88 |
| Thermal shock | Pass | Fail |
| Filiform corrosion | 5 mm, medium density | 8 mm, high density |

Example B

This example describes the preparation of six powder coating compositions based on an epoxy functional group containing acrylic polymer and a carboxylic acid group containing curing agent. Each of the Examples B-1 through B-5 contains a carboxylic acid functional polyester of Example 1 through Example 5, respectively. Comparative Example B-6 contains no polyester. Each of the examples was prepared from a mixture of the following ingredients:

| Ingredients: | Example B-1 (grams) | Example B-2 (grams) | Example B-3 (grams) | Example B-4 (grams) | Example B-5 (grams) | Example B-6 comparative |
|---|---|---|---|---|---|---|
| Polyester of Example 1 | 65.6 | — | — | — | — | — |
| Polyester of Example 2 | — | 65.6 | — | — | — | — |
| Polyester of Example 3 | — | — | 65.6 | — | — | — |
| Polyester of Example 4 | — | — | — | 65.6 | — | — |
| Polyester of Example 5 | — | — | — | — | 65.6 | — |
| Dodecanedioic acid | 95.7 | 108.6 | 63.8 | 117.2 | 112.5 | 65.6 |
| GMA acrylic resin[1] | 384.8 | 371.8 | 416.7 | 363.4 | 367.9 | 414.8 |
| EPON 1001F[2] | 23.0 | 23.0 | 23.0 | 23.0 | 23.0 | 23.0 |
| URAFLOW B | 2.9 | 2.9 | 2.9 | 2.9 | 2.9 | 2.9 |
| TINUVIN 900[3] | 2.4 | 2.4 | 2.4 | 2.4 | 2.4 | 2.4 |
| TROY 570 | 2.4 | 2.4 | 2.4 | 2.4 | 2.4 | 2.4 |

[1]ALMATEX A207S available from Reichold Chemicals, Inc.
[2]Polyglycidyl ether of Bisphenol A, having an equivalent weight of 1000, available from Shell Oil and Chemical Co.
[3]Micronized 2-(2'-hydroxy-benzotriazol-2-yl)-4,6-bis(methyl-1-phenylethyl) phenol, an ultraviolet absorber light stabilizer available from Ciba-Geigy Corp.

The ingredients of each of the Examples B-1 through B-6 immediately above were mixed via typical powder compounding techniques. Each powder composition was electrostatically applied to cleaned only aluminum substrate then cured at 340° F. (171° C.) for 20 minutes, and tested as described above for filiform corrosion resistance, haze rating, stability, thermal shock and 20° gloss. The following Table 2 illustrates the advantages of improved filiform corrosion resistance, while maintaining other performance properties, obtained by the incorporation of the particular carboxylic acid functional polyesters of Example 1 and Example 2 into the powder coating composition.

TABLE 2

| Test Performed: | Example B-1 | Example B-2 | Example B-3 | Example B-4 | Example B-5 | Example B-6 |
|---|---|---|---|---|---|---|
| Appearance | Clear; sharp | Exudate; dull | Clear; sharp | Heavy exudate | Powder too unstable* | Clear; sharp |
| Stability @35° C. | 7 days, good | 7 days, good | 7 days, slight cake | 7 days, cake | — | 7 days, good |
| Thermal shock | pass, slight haze | fail, chip | pass | fail, slight chip, haze | — | pass |
| Filiform corrosion | 2 mm., low density | 5 mm., low density | 5.5 mm., low density | 0 mm., heavy exudate | — | 9 mm., high density |

*It should be noted that the carboxylic acid functional polyester of Example 5 was very soft, hence the powder coating composition which incorporated this material was unstable. As a result, no data was generated for powder coating composition of Example B-5.

Example C

This example describes the preparation of four powder coating compositions based on a carboxylic acid functional polyester polymer and a beta-hydroxyalkylamide curing agent. Each of the Examples C-1, C-2 and C-3 incorporates a carboxylic acid functional polyester (different from the aforementioned carboxylic acid functional polymer), and Comparative Example C-4 contains no carboxylic acid functional polyester. The powder coating compositions were prepared from a mixture of the following ingredients:

| Ingredients: | Example C-1 (grams) | Example C-2 (grams) | Example C-3 (grams) | Example C-4 (comparative) (grams) |
|---|---|---|---|---|
| Polyester of Example 1 | 31.3 | — | — | — |
| Polyester of Example 2 | — | 31.3 | — | — |
| Polyester of Example 3 | — | — | 31.3 | — |
| PRIMID AL-552[1] | 40.9 | 45.8 | 28.7 | 26.9 |
| DSM-P800[2] | 453.1 | 448.1 | 465.0 | 498.1 |
| URAFLOW B | 2.0 | 2.0 | 2.0 | 2.0 |
| MICROWAX C[3] | 4.5 | 4.5 | 4.5 | 4.5 |
| TINUVIN 900 | 11.0 | 11.3 | 11.3 | 11.3 |
| TINUVIN 144[4] | 5.7 | 5.7 | 5.7 | 5.7 |
| TROY 570 | 5.7 | 5.7 | 5.7 | 5.7 |
| HCA-1[5] | 5.7 | 5.7 | 5.7 | 5.7 |
| Total | 560 | 554 | 554 | 560 |

[1]Beta-hydroxyalkylamide curing agent, available from EMS-American Grilon, Inc.
[2]Ultradurable acid functional polyester available from DSM Resins.
[3]Wax C MicroPowder, a fatty acid amide (bisstearamide of ethylene diamine) available from Hoechst-Celanese.
[4]2-tert-butyl-2-(4-hydroxy-3,5-di-tert-butylbenzyl)[bis(methyl-2,26,6-tetramethyl-4-piperinyl)dipropionate, an ultraviolet light stabilizer available from Ciba-Geigy Corp.
[5]9,10-dihydro-9-oxa-10-phosphaphenanthene-10-oxide (or 3,4,5,6-dibenzo-1,2-oxaphosphane-2-oxide), an anti-yellowing agent available from Sanko Chemical Co., Ltd.

The ingredients of each of the Examples C-1 through C-4 immediately above were mixed via typical powder compounding techniques. Each powder composition was electrostatically applied to cleaned only aluminum substrate then cured at 340° F. (171° C.) for 20 minutes, and tested as described above for filiform corrosion resistance, haze rating, haze cracking, stability, thermal shock and 20° gloss. The following Table 3 illustrates the improvement in filiform corrosion resistance, while maintaining other performance properties, obtained by the incorporation of the particular carboxylic acid functional polyesters of Example 1 and Example 2 into the powder coating composition.

TABLE 3

| Test Performed: | Example C-1 | Example C-2 | Example C-3 | Example C-4 (comparative) |
|---|---|---|---|---|
| 20° Gloss | 129 | 126 | 124 | 134 |
| Haze rating | 458 | 457 | 402 | 472 |
| Haze cracking | Pass | Pass | Fail | Pass |
| Stability @35° C. | 7 days, excellent | 7 days, excellent | 7 days, excellent | 7 days, excellent |
| Thermal shock | Pass | Pass | Fail, slight edge lift | Fail, slight edge lift |
| Filiform corrosion | 1 mm., low density | 5 mm., low density | 8 mm., high density | 10 mm., high density |

Example D

This example describes the preparation of two powder coating compositions based on an epoxy functional group containing acrylic polymer and a carboxylic acid functional curing agent. Example D-1 contains both the carboxylic acid functional polyester of Example 1 and a carboxylic acid functional curing agent, while Comparative Example D-2 contains only the carboxylic acid functional polyester with no acid functional curing agent. The powder coating compositions were prepared from a mixture of the following ingredients:

| Ingredients: | Example D-1 (grams) | Comparative Example D-2 (grams) |
|---|---|---|
| Polyester of Example 1 | 70.6 | 70.6 |
| Dodecanedioic acid | 103.0 | — |
| GMA acrylic resin[1] | 414.4 | 414.4 |
| EPON 1001F | 35.4 | 35.4 |
| URAFLOW B | 4.4 | 4.4 |
| TINUVIN 900 | 3.7 | 3.7 |
| TROY 570 | 3.7 | 3.7 |

[1]ALMATEX A207S available from Reichold Chemicals, Inc.

The ingredients of each of the Examples D-1 and D-2 immediately above were mixed via typical powder compounding techniques. Each powder composition was electrostatically applied to cleaned only aluminum substrate then cured at 340° F. (171° C.) for 20 minutes, and tested as described above for appearance (rated by visual inspection), haze rating, 20° gloss, and extent of cure. The following Table 4 illustrates that the carboxylic acid functional polyester is present in the powder coating compositions of the invention in an amount insufficient to cure the coating composition in the absence of the curing agent.

TABLE 4

| Test performed: | Example D-1 | Example D-2 |
|---|---|---|
| Appearance | smooth, clear | smooth, clear |
| MBK solvent rubs (200×) | Pass, slight scratch | Fail at 100 rubs, complete break through |
| 20° Gloss | 128 | 128 |
| Haze rating | 457 | 456 |

What is claimed is:

1. In a curable powder coating composition comprising a particulate film-forming mixture of a polymer containing reactive functional groups and a curing agent therefor having functional groups reactive with the functional groups of the polymer and being present in an amount sufficient to cure said polymer, the improvement comprising the inclusion in said composition of a polyester having carboxylic acid functional groups, said polyester comprising an oligomer having the following structure:

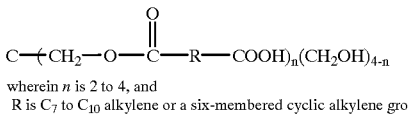

wherein $n$ is 2 to 4, and
R is $C_7$ to $C_{10}$ alkylene or a six-membered cyclic alkylene group, and where the polyester is present in an amount ranging from 2 to 5 weight percent based on total weight of resin solids in the powder coating composition, said amount being sufficient to improve the adhesion to metal and filiform corrosion resistance of the powder coating composition, but insufficient to cure the coating composition in the absence of the curing agent.

2. In a curable powder coating composition comprising a particulate film-forming mixture of a polymer containing reactive functional groups and a curing agent therefor having functional groups reactive with the functional groups of the polymer and being present in an amount sufficient to cure said polymer, the improvement comprising the inclusion in said composition of a polyester having carboxylic acid functional groups, said polyester being the reaction product of the following reactants:

(a) pentaerithrytol; and (b) a dicarboxylic acid having the following structure:

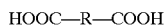

HOOC—R—COOH wherein R is $C_7$ to $C_{10}$ alkylene or a six-membered cyclic alkylene group, and where the polyester is present in an amount ranging from 2 to 5 weight percent based on total weight or resin solids in the powder coating composition, said amount being sufficient to improve the adhesion to metal and filiform corrosion resistance of the powder coating composition, but insufficient to cure the coating composition in the absence of the curing agent.

3. The powder coating composition of claim 2 wherein when R is $C_{10}$ alkylene.

4. The powder coating composition of claim 2 wherein when R is a six-membered cyclic alkylene group.

5. The powder coating composition of claim 1 wherein the polymer containing reactive functional groups is selected from the group consisting of a polyester polymer having carboxylic acid functional groups and an acrylic polymer having carboxylic acid functional groups.

6. The powder coating composition of claim 5 wherein the curing agent is a beta-hydroxyalkylamide.

7. The powder coating composition of claim 5 wherein the curing agent is triglycidylisocyanurate.

8. The powder coating composition of claim 5 wherein the curing agent is a polyepoxide.

9. The powder coating composition of claim 1 wherein the polymer containing reactive functional groups is an acrylic polymer having epoxy functional groups.

10. The powder coating composition of claim 9 wherein the curing agent is a polycarboxylic acid different from said polyester.

11. A coated article comprising an aluminum substrate and a cured coating thereon, said cured coating being derived from a curable powder coating composition comprising a particulate film-forming mixture of a polymer containing reactive functional groups and a curing agent therefor having functional groups reactive with the functional groups of the polymer and being present in an amount sufficient to cure said polymer, wherein the improvement comprises the inclusion in said composition of a polyester comprising an oligomer having the following structure:

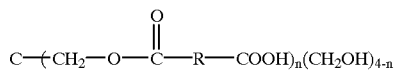

C—(CH₂—O—C—R—COOH)ₙ(CH₂OH)₄₋ₙ

-continued wherein $n$ is 2 to 4, and
R is $C_7$ to $C_{10}$ alkylene or a six-membered cyclic alkylene group, and where the polyester is present in an amount ranging from 2 to 5 weight percent based on total weight of resin solids in the powder coating composition, said amount being sufficient to improve the adhesion to metal and filiform corrosion resistance of the powder coating composition, but insufficient to cure the coating composition in the absence of the curing agent.

12. A coated article comprising an aluminum substrate and a cured coating thereon, said cured coating being derived from a curable powder coating composition comprising a particulate film-forming mixture of a polymer containing reactive functional groups and a curing agent therefor having functional groups reactive with the functional groups of the polymer and being present in an amount sufficient to cure said polymer, wherein the improvement comprises the inclusion in said composition of a polyester having carboxylic acid functional groups, said polyester being the reaction product of the following reactants:

(a) pentaerithrytol; and (b) a dicarboxylic acid having the following structure:

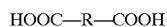

HOOC—R—COOH wherein R is $C_7$ to $C_{10}$ alkylene or a six-membered cyclic alkylene group, and where the polyester is present in an amount ranging from 2 to 5 weight percent based on total weight of resin solids in the powder coating composition, said amount being sufficient to improve the adhesion and filiform corrosion resistance of the powder coating composition, but insufficient to cure the coating composition in the absence of the curing agent.

13. The coated article of claim 12 wherein when R is $C_{10}$ alkylene.

14. The coated article of claim 12 wherein when R is a six-member cyclic alkylene group.

15. The coated article of claim 12 wherein the polymer containing reactive functional groups is selected from the group consisting of a polyester polymer having carboxylic acid functional groups and an acrylic polymer having carboxylic acid functional groups.

16. The coated article of claim 15 wherein the curing agent is a beta-hydroxyalkylamide.

17. The coated article of claim 15 wherein the curing agent is triglycidylisocyanurate.

18. The coated article of claim 15 wherein the curing agent is a polyepoxide.

19. The coated article of claim 13 wherein the polymer containing reactive functional groups is an acrylic polymer having epoxy functional groups.

20. The coated article of claim 19 wherein the curing agent is a polycarboxylic acid different from said polyester.

* * * * *